US005700579A

United States Patent [19]

Jeanvoine et al.

[11] Patent Number: 5,700,579
[45] Date of Patent: Dec. 23, 1997

[54] GLASS COMPOSITIONS INTENDED FOR THE PRODUCTION OF PANES

[75] Inventors: Pierre Jeanvoine, Poissy; Michel Lismonde, Courbevoie, both of France; Jacques Vieslet, Ceroux Mousty, Belgium

[73] Assignee: Saint-Gobain Vitrage, Courbevoie, France

[21] Appl. No.: 308,266

[22] Filed: Sep. 19, 1994

[30] Foreign Application Priority Data

Sep. 17, 1993 [FR] France .................. 93 11129

[51] Int. Cl.$^6$ ............................. B32B 17/10
[52] U.S. Cl. .................. 428/437; 428/426; 428/429; 428/441; 501/53; 501/55; 501/68; 501/70; 501/71; 501/904; 501/905
[58] Field of Search ................... 501/53, 55, 68, 501/70, 71, 904, 905; 428/437, 426, 429, 441

[56] References Cited

U.S. PATENT DOCUMENTS

| | | | |
|---|---|---|---|
| 4,701,425 | 10/1987 | Baker et al. | 501/70 |
| 4,792,536 | 12/1988 | Pecoraro | 501/70 |
| 5,077,133 | 12/1991 | Cheng | 428/426 |
| 5,214,008 | 5/1993 | Beckwith et al. | 501/69 |
| 5,384,346 | 1/1995 | Gutweiler | 524/100 |

FOREIGN PATENT DOCUMENTS

| | | |
|---|---|---|
| A-0 469 446 | 2/1992 | European Pat. Off. . |
| A-0 488 110 | 6/1992 | European Pat. Off. . |
| A-0 598 305 | 5/1994 | European Pat. Off. . |
| WO-A-91 07356 | 5/1991 | WIPO . |

*Primary Examiner*—Timothy Speer
*Attorney, Agent, or Firm*—Oblon, Spivak, McClelland, Maier & Neustadt, P.C.

[57] ABSTRACT

Glass compositions containing, expressed in percentages by weight, from 0.75 to 1.4% total iron expressed in the form $Fe_2O_3$, from 0.25 to 0.32% ferrous iron in the form of FeO and which has, and at a thickness of between approximately 3 and 3.3 millimeters, exibit a total light transmission factor under illuminent A ($TL_A$) of at least 70%, a total energy transmission factor ($T_E$) less than approximately 46% and a transmission factor for ultraviolet radiation ($T_{UV}$) less than approximately 25%, and are suitable for the production of windows or panes for use in the architectural field or in automobile and industrial vehicles.

16 Claims, No Drawings

Page 1

GLASS COMPOSITIONS INTENDED FOR THE PRODUCTION OF PANES

BACKGROUND OF THE INVENTION

1. Field of the Invention

The present invention relates to glass compositions adapted for the production of windows suitable, especially for use in the architectural field or in automobile and industrial vehicles.

2. Discussion of the Background

The windows used for the latter application must satisfy legal requirements relating to their light transmission. A window intended for the construction of a windscreen (windshield) must have a total light transmission factor under illuminant A ($TL_A$) of at least 75%. The windows or panes intended for the construction of the lateral and rear windows must have, under the same conditions, a $TL_A$ factor of at least 70%.

The glazed area of automobile vehicles is now very large, and client expectations with regard to comfort become more and more exacting. Manufacturers of these vehicles are seeking any and every means to reduce the heat experienced by passengers from solar radiation.

To maintain a high light transmission in the visible part of the spectrum while at the same time absorbing as much as possible the remainder of the solar energy, it is known to introduce iron into the composition of the glass. Iron is present in the glass both in the form of ferric oxide ($Fe_2O_3$) and ferrous oxide (FeO). $Fe_2O_3$ in glass enables the absorption of UV radiations and short wavelength radiation in the visible part of the spectrum; in contrast, FeO in glass enables the absorption of radiation in the near IR and long wavelength visible radiation. Although increasing the iron content, in either oxide form, enhances the absorption of the radiation at the two ends of the visible spectrum, this effect is at the expense of the light transmission.

Various solutions have been proposed for making the most use of the iron oxides to absorb radiation, while at the same time maintaining the highest possible light transmission. Patent EP-B-297 404 describes silico-sodo-calcic glasses in which the total iron content, expressed in the form of $Fe_2O_3$, is between 0.45 and 0.65%. These glasses are produced so that at least 35%, and preferably at least 50%, of the total iron is in the form of FeO. The increase in the FeO content enables the absorption of glass in the infrared to be increased and the total energy transmission factor ($T_E$) to be reduced. However, when glass is manufactured in the presence of sulfur in highly reducing conditions, it takes on an amber color due to the formation of chromophores resulting from the reaction between sulfur and ferric iron. To prevent this, it is necessary to eliminate sulfates in the vitrifiable mixture. Furthermore, since the sulfur content in glass is never zero, the total iron content must be rigorously limited to ensure that the percentage of ferric iron remains low. It follows that the capacity of this glass to absorb UV radiations is mediocre.

Glass is known which has a higher total iron content than that specified by the above-mentioned European Patent, but still has good light transmission and good absorption of infrared and ultraviolet radiation. U.S. Pat. No. 5,214,008 describes glass devoid of ceric oxide and other oxides of this type, which contains from 0.7 to 0.95% by weight total iron expressed in the form $Fe_2O_3$. This glass is produced in conventional furnaces, from ordinary vitrifiable raw materials. The degree of oxidation-reduction of the glass is controlled by the introduction of carbon and sodium sulfate into the vitrifiable mixture. The oxidation-reduction degree varies within precise limits so that iron in the form of FeO in the glass varies from 0.19 to 0.24% by weight. This glass has a light transmission factor higher than 70%, a transmission factor in the ultraviolet lower than 38% and a total energy transmission factor less than 44.5%, for a thickness of from 3.7 to 4.8 millimeters.

Other compositions of silico-sodo-calcic glass for a given thickness, have a light transmission factor of at least 70% and good absorption of the infrared and ultraviolet radiation, such as those described in Patent Applications EP-A-488 110 and WO-91/07356. Apart from the iron oxides, the glasses specified in these Patent Applications contain ceric oxide and titanium oxide. These oxides enable an increase in the absorption of ultraviolet radiation. They do, however, have disadvantages. Cerium oxide is expensive, and its use increases the price of the glass. Cerium oxide also influences the equilibrium between ferrous and ferric oxides, reducing the amount of ferrous oxide. Titanium oxide reduces light transmission in the visible range. Thus, there remains a need for a glass that has a high visible light transmission, but that transmits much less of other parts of solar radiation.

SUMMARY OF THE INVENTION

Accordingly, it is one object of the present invention to provide a glass for vehicles and buildings that has a high visible light transmission, but with a large absorption of infrared and ultraviolet radiation.

It is another object of the present invention to provide a glass that is inexpensive to produce and can be poured onto the surface of a bath of molten metal.

It is another object of the present invention to provide a glass in which the radiation transmission characteristics are mainly controlled by iron oxides.

It is still another object of the present invention to provide a glass with radiation transmission characteristics superior to the glasses previously described.

These and other objects, which will become apparent during the following detailed description, have been achieved by the inventors discovery that compositions of silico-sodo-calcic glass which contain, expressed in percentages by weight, from 0.75 to 1.4% of total iron expressed in the form of $Fe_2O_3$, from 0.25 to 0.32% of ferrous iron in the form of FeO, having a thickness of approximately between 3 and 3.3 millimeters, exibit a total light transmission factor under illuminant A ($TL_A$) of at least 70%, a total energy transmission factor ($T_E$) less than approximately 46% and an ultraviolet radiation transmission ($T_{uv}$) factor less than approximately 25%. The values of light transmission and energy transmission have been determined by the Parry Moon Mass 2 method; the transmission in the ultraviolet has been determined by the method defined by the standard ISO 9050.

The present invention provides glass which can be poured onto the surface of a bath of molten metal, with the transmission characteristics that are principally regulated by the presence of iron oxides. The glass of the present invention has an absorption of infrared and ultraviolet radiation at least equivalent to that of the previously described glasses, but for a smaller thickness.

The glass according to this invention is prepared from common raw materials in conventional furnaces used in the technical field of float glass production. The melting and refining of the glasses according to this invention takes place in flame furnaces. If desired, electrodes can be used to ensure that the glass is heated by the passage of an electric current between the electrodes. The oxidation-reduction degree of the glass is controlled by oxidizing agents, such as sodium sulfate, and reducing agents, such as coke. Other oxidizing agents, such as other sulfates, or Other reducing agents, such as graphite or organic substances, could be used. The quantity of sodium sulfate introduced into the vitrifiable mixture, allowing for the characteristics of the furnace in which this mixture is melted, is such that the $SO_3$ content of the glass generally lies between 0.10 and 0.35%.

The amount of reducing agents associated with the sulfate, allowing for the characteristics of the furnace used to produce the glass, is calculated so that the oxidation-reduction degree of the glass is maintained within precise limits. These limits are defined by the extreme values of the ratio between the quantity of ferrous iron expressed in the form of FeO, and the quantity of total iron expressed in the form $Fe_2O_3$. According to the invention, this ratio of the weight of $FeO/Fe_2O_3$ varies from 22 to 34%; it preferably lies between 25 and 30%.

The glass of the present invention does not require the addition of expensive materials such as Ce oxide, Ti oxide, or rare earth oxides. Ce oxide and Ti oxide can be limited to less than 0.1%, 0.05%, or even 0.01%, based on weight percent.

DETAILED DESCRIPTION OF THE PREFERRED EMBODIMENTS

The glass according to this invention is silico-sodo-calcic glass that contains the constituents listed below within the following limits, expressed in percentages by weight, based on the total weight of said glass:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ | 0.75 to 1.4% |
| (total iron expressed in this form) | |
| FeO | 0.25 to 0.32% |
| $SO_3$ | 0.10 to 0.35% |

The glass according to this invention may contain, in addition, other constituents considered as impurities and introduced along with the vitrifiable raw materials employed, and/or by the glass cullet introduced into the vitrifiable mixture and containing a small quantity of coloring agents other than iron oxides. These impurities amount to less than 0.1% by weight of the glass; they are, for example, titanium, cobalt, nickel, chromium, selenium, manganese or vanadium. Impurities can be limited to 0.05% by weight, or even 0.01% by weight. Furthermore, some of these impurities could be reduced to 10 part per million or less.

The amount of the constituents can preferably fall in the following limits (weight percent, based on the total weight of said glass):

| | |
|---|---|
| $SiO_2$ | 68 to 73% |
| $Al_2O_3$ | 0.3 to 2% |
| $B_2O_3$ | 0 to 2% |
| CaO | 4 to 12% |

-continued

| | |
|---|---|
| MgO | 0 to 4.5% |
| $Na_2O$ | 10 to 16% |
| $K_2O$ | 0 to 3% |
| $Fe_2O_3$ | 0.85 to 1.3% |
| (total iron expressed in this form) | |
| FeO | 0.27 to 0.30% |
| $SO_3$ | 0.15 to 0.30% |

In the glass according to this invention, the total iron content and the control of the respective ferrous oxide and ferric oxide contents, enable a notable absorption of the infrared and ultraviolet radiation with a relatively small thicknesses. This is especially advantageous when the glass is intended for the construction of thin windows.

The transmission characteristics of the glass of the present invention, for a thickness of 3.15 millimeters can preferably be:

| | |
|---|---|
| $T_E$ | 45% or less |
| $T_{UV}$ | 22% or less |

In addition to the transmission characteristics mentioned earlier, the glass according to this invention has a blue-green tint. The dominant wavelength under illuminant C generally lies between 490 and 505 nanometres. Having generally described this invention, a further understanding can be obtained by reference to certain specific examples which are provided therein for purposes of illustration only and are not intended to be limiting unless otherwise specified.

EXAMPLE

The vitrifiable mixture used for obtaining 100 grams of glass is as follows:

| | |
|---|---|
| sand | 63 g |
| limestone | 5.7 g |
| dolomite | 21.4 g |
| nephalite | 0.90 g |
| sodium carbonate | 27.3 g |
| sodium sulfate | 0.75 g |
| rouge | 0.9 g |
| coke | 0.035 g |

The glass was prepared in a conventional furnace. The analysis of the glass obtained, expressed in percentages by weight, is as follows:

| | |
|---|---|
| $SiO_2$ | 70.57% |
| $Al_2O_3$ | 0.62% |
| CaO | 9.50% |
| MgO | 3.90% |
| $Na_2O$ | 13.90% |
| $K_2O$ | 0.09% |
| $SO_3$ | 0.18% |
| $Fe_2O_3$ (total iron) | 0.95% |
| FeO | 0.285% |
| $FeO/Fe_2O_3$ (total iron) | 0.30% |

The transmission characteristics of this glass, measured as specified earlier for a thickness of 3.15 millimeters, are as follows:

| | |
|---|---|
| TL$_A$ | 71% |
| T$_E$ | 43.5% |
| T$_{UV}$ | 18% |

This glass has a dominant wavelength under illuminant C of 499 nanometres.

The glass according to the invention may be converted into a continuous ribbon or band by using the float glass technique. The glass sheets obtained by cutting this ribbon have thicknesses varying between 1 and 5 millimeters. These glass sheets may be used either alone or together to form windows intended, notably, to be mounted in automobiles.

For constructing windscreens or lateral windows or panes, a single sheet of glass, or two glass sheets separated by an intermediate sheet of an organic material, such as a polymer, are used. The total thickness of the glass is most commonly between 3 and 4 millimeters. With these thicknesses, the glass according to this invention assure good absorption of ultraviolet radiation and good thermal comfort.

Like other windows, the windows produced from the glass according to this invention may be subjected in advance to surface treatments. These windows may be coated, for example, with an organic material such as a film based upon polyurethanes having antiscratch properties, or a film assuring a seal in the case of breakage; they also may be coated with an enamel film.

The windows according to this invention may be coated with at least one metallic oxide film produced by chemical deposition at high temperature by the techniques of pyrolysis or chemical vapor phase deposition (CVD) or by deposition under vacuum.

This application is based upon the French Patent Application 93/11129, filed Sep. 17, 1993, which is incorporated herein, in it entirety, by reference.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A glass, comprising, in percentage by weight, based on the total weight of said glass:

(a) 0.75 to 1.4% total iron, expressed in the form $Fe_2O_3$; and (b) 0.25 to 0.32% ferrous iron, expressed in the form FeO;

wherein said glass has a light transmission factor under illuminant A (TL$_A$) of at least 70%, a total energy transmission factor (T$_E$) less than 46%, and a transmission factor for ultraviolet radiation (T$_{UV}$) less than 25%, when said glass has a thickness between 3 and 3.3 millimeters, wherein said glass comprises less than 0.1% of Ce oxide and less than 0.1% of Ti oxide.

2. The glass of claim 1, wherein said glass has a ratio percentage of the weight of ferrous iron in the form FeO, to the total iron expressed in the form $Fe_2O_3$, of 22 to 34%.

3. The glass of claim 2, wherein said ratio percentage is from 25 to 30%.

4. The glass of claim 1, wherein said total iron, expressed in the form $Fe_2O_3$, is from 0.85 to 1.3%.

5. The glass of claim 1, wherein said transmission factor for ultraviolet radiation (T$_{UV}$) is less than 22%.

6. The glass of claim 1, consisting essentially of, in percentages by weight:

(a) 0.75 to 1.4% total iron, expressed in the form $Fe_2O_3$;

(b) 0.25 to 0.32% ferrous iron, expressed in the form FeO;

(c) 64 to 75% $SiO_2$;

(d) 0 to 5% $Al_2O_3$;

(e) 0 to 5% $B_2O_3$;

(f) 2 to 15% CaO;

(g) 0 to 5% MgO;

(h) 9 to 18% $Na_2O$;

(i) 0 to 5% $K_2O$;

(j) 0.10 to 0.35% $SO_3$; and (k) less than 0.1% impurities.

7. The glass of claim 1, wherein said glass consists essentially of, in percent by weight;

(a) 0.85 to 1.3% total iron, expressed in the form $Fe_2O_3$;

(b) 0.27 to 0.30% ferrous iron, expressed in the form FeO;

(c) 68 to 73% $SiO_2$;

(d) 0.3 to 2 % $Al_2O_3$;

(e) 0 to 2% $B_2O_3$;

(f) 4 to 12% CaO;

(g) 0 to 4.5% MgO;

(h) 10 to 16% $Na_2O$;

(i) 0 to 3% $K_2O$;

(j) 0.15 to 0.3% $SO_3$; and (k) less than 0.1% impurities.

8. The glass of claim 7, wherein said glass contains less than 0.05% of said impurities.

9. The glass of claim 6, wherein said glass has a weight ratio percentage of ferrous iron expressed in the form FeO, to total iron expressed in the form $Fe_2O_3$, of 22–34%.

10. The glass of claim 9, wherein said ratio percentage is 25–30%.

11. The glass of claim 6, wherein said transmission factor for ultraviolet radiation (T$_{UV}$) is less than 22%.

12. A window, comprising:

a first sheet of glass;

an organic polymer on said first sheet of glass; and a second sheet of glass on said organic polymer;

wherein said first sheet of glass comprises a glass composition comprising, in weight percent, (a) 0.75 to 1.4% total iron, expressed in the form $Fe_2O_3$, and (b) 0.25 to 0.32% ferrous iron, expressed in the form FeO, and said glass composition, has a total light transmission factor under illuminant A (TL$_A$) of at least 70%, a total energy transmission factor (T$_E$) less than 46%, and a transmission factor for ultraviolet radiation (T$_{UV}$) of less than 25%, when said glass composition has a thickness between 3 and 3.3 millimeters, wherein said first sheet of glass contains less than 0.1% of Ce oxide and less than 0.1% of Ti oxide.

13. The window of claim 12, wherein said first glass sheet consists essentially of, in percent by weight:

(a) 0.75 to 1.4% total iron, expressed in the form $Fe_2O_3$;

(b) 0.25 to 0.32% ferrous iron, expressed in the form FeO;
(c) 64 to 75% $SiO_2$;
(d) 0 to 5% $Al_2O_3$;
(e) 0 to 5% $B_2O_3$;
(f) 2 to 15% CaO;
(g) 0 to 5% MgO;
(h) 9 to 18% $Na_2O$;
(i) 0 to 5% $K_2O$;
(j) 0.10 to 0.35% $SO_3$; and
(k) less than 0.1% impurities.

14. The glass of claim 1, wherein said glass comprises 0.27 to 0.32% ferrous iron, by weight, expressed in the form FeO.

15. The window of claim 12, wherein said transmission factor for ultraviolet radiation ($T_{UV}$) is less than 22%.

16. The window of claim 12, wherein said first sheet of glass comprises 0.27 to 0.32% ferrous iron, in weight percent, expressed in the form FeO.

* * * * *